Figure 1:
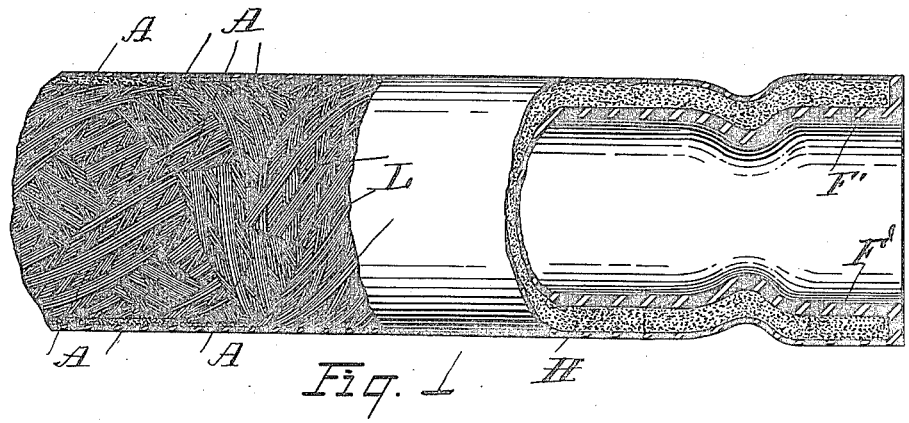

L. A. SUBERS.
HOSE.
APPLICATION FILED NOV. 3, 1913.

1,227,690.

Patented May 29, 1917.

Witnesses
Ernest Mosman
Adam Meyer

Inventor
Lawrence A. Subers
By Wm. M. Monroe
Attorney

UNITED STATES PATENT OFFICE.

LAWRENCE A. SUBERS, OF CLEVELAND, OHIO.

HOSE.

1,227,690.  Specification of Letters Patent.  Patented May 29, 1917.

Application filed November 3, 1913. Serial No. 798,964.

*To all whom it may concern:*

Be it known that I, LAWRENCE A. SUBERS, a citizen of the United States, and resident of Cleveland, in the county of Cuyahoga and State of Ohio, have invented certain new and useful Improvements in Hose, of which I hereby declare the following to be a full, clear, and exact description, such as will enable others skilled in the art to which it appertains to make and use the same.

The objects of the invention are to provide a pressure tubing or hose adapted to sustain high internal pressure with means for adapting it to make pressure tight connections at its ends, with a metallic nipple or coupling, and also to so shape the interior surface of the hose that it can be sleeved over the nipple or coupling and conform itself to the surface thereof without disturbing or distorting the fibrous elements composing the body of the hose or subjecting them to such a strain that it would affect the integrity and durability thereof.

Standard forms of nipples employed by railways, steam engineers and others for coupling brake hose, signal and steam hose and other pressure hose and tubing are provided with tapered outer ends adapted to enter the open end of the hose and with annular ribs or enlargements over which the hose is drawn and also with cylindrical portions beyond the annular enlargements upon which the extremities of the hose are securely clamped.

It is at this coupling that defects in the hose first develop and the hose primarily shows signs of wear and leakage.

In ordinary practice loom made fabric hose such as is composed of canvas layers embedded in rubber must be expanded to draw it over these annular enlargements, and since such hose are subject to longitudinal shrinkage and lateral expansion when put under internal pressure, and also are subject to a certain amount of twisting motion, this method of coupling hose is productive of considerable movement upon the coupling and the elements and layers composing the fabric are stretched and distorted and are not capable of long sustaining the pressure, and the integrity of the fabric and life of the hose is materially reduced thereby.

On the other hand, if the hose is so constructed as to be substantially free from expansion and contraction it cannot be forced over the annular enlargement on the nipple without distorting and injuring the fibrous layers comprising the hose, and the portion engaging the enlargement will become weakened and the hose will give out at this point. Elongation of the hose under pressure does not have a harmful effect since it will draw the hose more tightly over the nipple.

In the improved hose hereinafter described each coupling end is provided with an internal annular groove or recess of substantially the same diameter as that of the annular enlargement, and the internal diameter of the portion exterior to the groove is such as to grip firmly the cylindrical portion of the nipple.

The invention is hereinafter more fully described, illustrated in the accompanying drawings and specifically pointed out in the claims.

Figure 2:
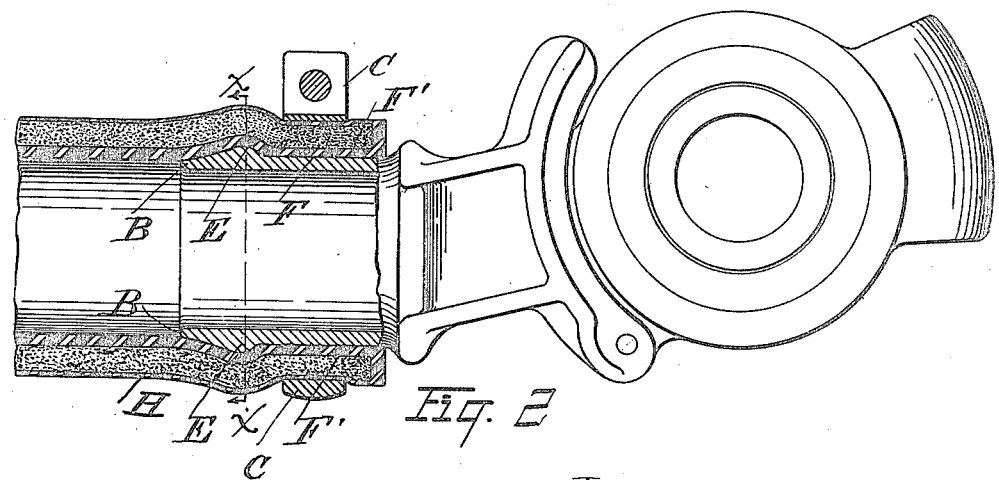
Figure 3:
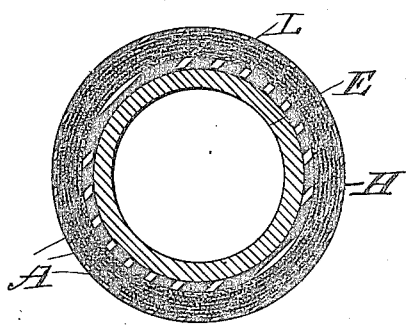

In the accompanying drawings Figure 1 is a longitudinal section of the improved hose, showing portions broken away to exhibit the several layers; Fig. 2 is a longitudinal section showing an air brake coupling attached thereto; Fig. 3 is a transverse section thereof on line $x$—$x$ Fig. 2.

In these views the hose H is shown to comprise a structure formed of laminated cohering fabric bands A, A according to the structure described in my previously granted Patent No. 1,011,090 in which the amount of expansion in any direction can be accurately controlled by means of the angle of winding of the fibrous elements in each band, and also by means of the angle at which the bands are wound in the several layers.

The outer layer L is composed of bands wound in a close spiral and forms the binding layer for the hose or tubing, and is only slightly expansible. The fabric layers are covered inside and out by layers of rubber, as in previously known forms of hose.

In this hose the amount of expansion laterally and longitudinally is exactly controlled in the manufacture and is reduced to the minimum so that it could not be expanded by pressure to fit upon the enlarged portion of the nipple without straining the fabric and lessening its efficiency for use.

To avoid this difficulty the hose is wound upon a mandrel of the proper diameter of the inner surface of the hose and upon which an annular ridge or enlargement is formed similar to that upon the nipple, shown in Fig. 2 at E, which enters the corresponding annular recess E' in the hose.

The cylindrical portion of the nipple F is also represented in this mandrel, and the inner surface of the hose conforms thereto at the outer end at F'.

This cylindrical portion of the nipple is of slightly greater internal diameter than that of the body of the hose and the internal diameter of the corresponding portion of the hose F' is made of a diameter slightly smaller than the corresponding part of the nipple so as to fit tightly upon the nipple before the clamping device is attached. The part F' of the hose is, however, of an internal diameter somewhat greater than that of the main length of the hose so that the enlargement E may pass into the position shown in Fig. 2 without stretching the part F' of the hose beyond its elastic limit. The original internal diameter of the part F' as compared with the remainder of the hose is shown in Fig. 1.

The extremity B of the nipple is preferably tapered and is of substantially the same diameter at the end as the internal diameter of the hose.

In this form of construction there is no strain put upon the wall of the annular recess when the hose is forced upon the nipple, and when internal pressure is applied to the hose the effect of the pressure is received at the ends of the hose without injury thereto, since the elements composing the fabric are not distorted in any manner upon the annular enlargement E, and cannot be torn apart or become affected differently from the fibrous elements composing the body of the hose.

Any movements of the hose will be received upon the annular enlargements at its end, and since there has been no distortion by lateral expansion or twisting therein, there will be no danger of the fabric breaking loose at this point and causing a leak.

The hose can be clamped upon the coupling or nipple without disturbing the elements of the tube, lining and external wrapping.

The hose is designed to cling to the cylindrical part of the nipple of increased diameter and the tapered extremity of the nipple is preferably a close fit, thus affording no opening for the escape of air or fluid under pressure. The clamp C being at the rear of said enlargement does not reduce the strength of the hose, but tends to still further increase the pressure of the enlarged portion of the hose upon the enlarged portion of the nipple.

Having described the invention what I claim as new and desire to secure by Letters Patent is:

1. As an article of manufacture, a hose comprising a fabric body portion of predetermined length longitudinal and lateral expansibility having an annular groove adjacent to each end, that portion of the hose lying between each groove and the outer extremity of the hose, having a larger internal diameter than the internal diameter of the body of the hose.

2. In a rubbered fabric hose pipe a main body portion composed of substantially nonexpansible material and having a central opening of predetermined diameter and an integral extremity therefor having an opening of larger diameter, the opening in said extremity separated from the opening in said body portion by an annular groove.

3. In a hose a body portion having an opening of predetermined diameter, said hose formed of rubbered fabric of predetermined length expansibility and extremities therefor integrally connected therewith said extremities having openings of larger diameter and centrally located, the openings in said extremities separated from the opening in said body portion by annular grooves.

4. In a hose, a body portion having an opening of predetermined diameter, said hose formed of rubber fabric having a predetermined minimum amount of lateral and longitudinal expansibility, and extremities therefor integrally connected therewith, said extremities having openings of larger diameter and centrally located with respect to the openings in said body portion, said extremities being separated from said body portion by annular grooves.

5. In a hose, a body portion having an opening of predetermined diameter, said hose being formed of rubber fabric having a predetermined minimum amount of lateral and longitudinal expansibility, and extremities therefor integrally connected therewith, said extremities being likewise of a minimum predetermined expansibility both laterally and longitudinally, said extremities having a cylindrical inner surface of slightly larger diameter than the opening through the body of the hose, and an inwardly projecting portion directly connecting said extremities with said body portion, said last mentioned portion being adapted to reverse its position upon the insertion of a nipple into the ends of the hose, thereby forming an internal recess or groove for the reception of an annular enlargement on the nipple.

6. In a hose, a body portion having an opening of predetermined diameter, said hose being formed of rubber fabric having a predetermined minimum amount of lateral and longitudinal expansibility, extremities for said body portion having an internal cylindrical surface of slightly larger diameter than the opening through the body portion, said extremities being likewise of minimum predetermined lateral and longitudinal expansibility, and an annular portion integrally connecting said extremities with the body portion for providing an internal recess adapted to receive an annular enlargement on the end of a nipple.

In testimony whereof, I hereunto set my hand this 31st day of October 1913.

LAWRENCE A. SUBERS.

In presence of—
ERNEST MOSMAN,
ADAM MEYER.